Oct. 4, 1938.  C. G. McKEE  2,132,308
PLANTING IMPLEMENT
Filed April 20, 1937
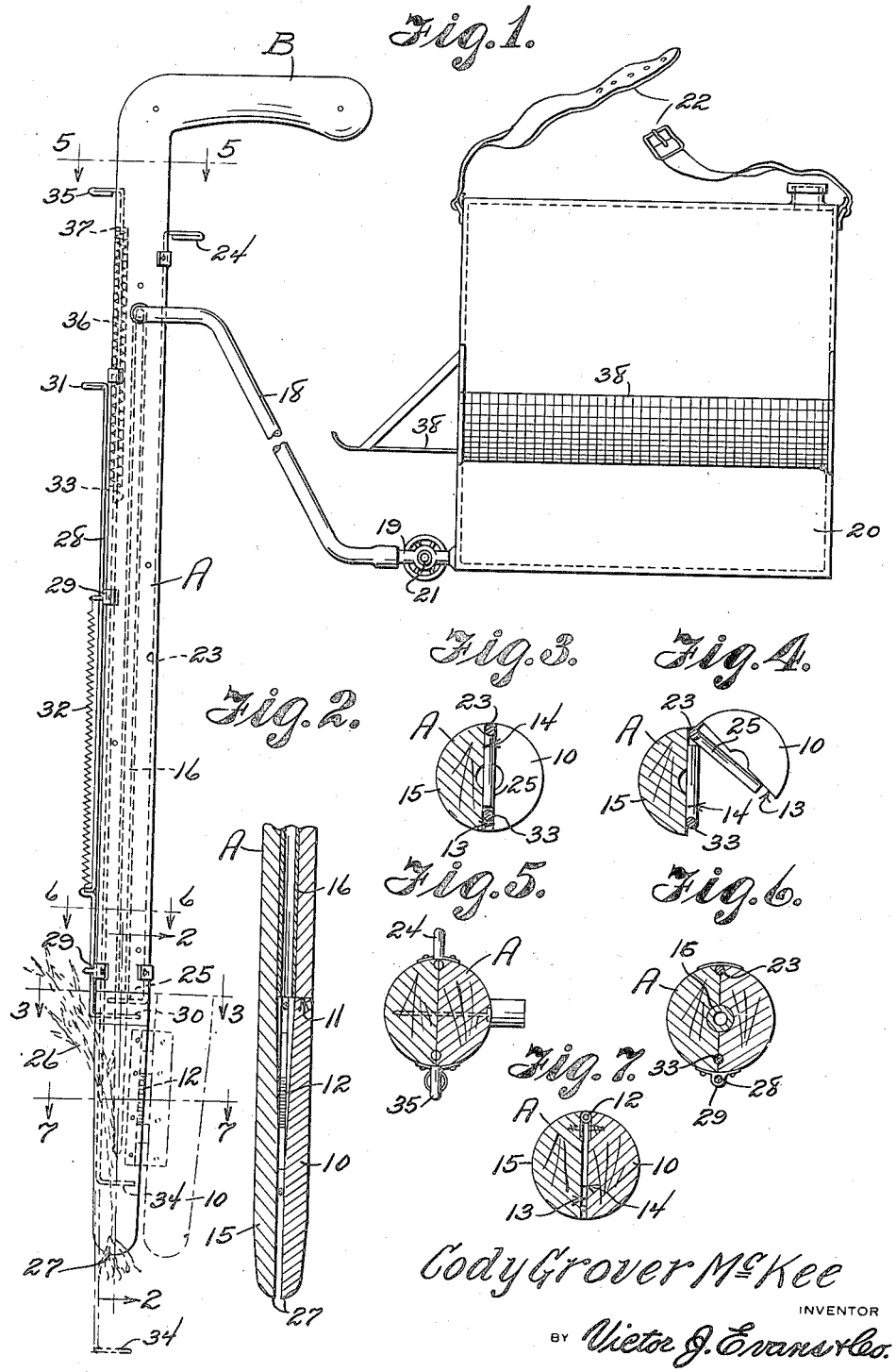
Cody Grover McKee
INVENTOR
BY Victor J. Evans & Co.
ATTORNEYS Patented Oct. 4, 1938

2,132,308

UNITED STATES PATENT OFFICE 2,132,308

PLANTING IMPLEMENT

Cody Grover McKee, Nashville, Tenn.

Application April 20, 1937, Serial No. 138,011

2 Claims. (Cl. 111—4)

The invention relates to a planting implement and more particularly to a plant setter.

The primary object of the invention is the provision of an implement of this character, wherein small plants can be mechanically handled for the setting of the same in the soil to effect the planting of the same without liability of damage to the roots of such plants during the setting of the same and also avoiding root congestion on the planting.

Another object of the invention is the provision of an implement of this character, wherein the soil can be softened for the formation of a hole in a convenient manner so that small plants can be set in the soil and properly planted, the implement serving as a ground tamper for the packing of the soil or earth around the plant on the setting of the same therein.

A further object of the invention is the provision of an implement of this character, wherein a plant to be planted can be properly held and gripped so as to enable the setting of such plant in the soil without necessitating manual gripping thereof or handling and during the setting or planting operation the plant can be watered as well as the soil softened for easy planting operation, the implement being novel in construction.

A still further object of the invention is the provision of an implement of this character, wherein the same is susceptible of being carried on the person and is hand operable for the mechanical planting or setting of plants in the ground without liability of damage to the plant or plants during the planting operation.

A still further object of the invention is the provision of an implement of this character, which is extremely simple in construction, thoroughly reliable and effective in its operation, convenient for quick planting, strong, durable, readily and easily handled, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side elevation of an implement constructed in accordance with the invention showing by full lines the holding of a small plant for its planting and by dotted lines an adjusted position for the freeing of the plant after the setting or planting thereof.

Figure 2 is a fragmentary sectional view taken on the line 2—2 of Figure 1 looking in the direction of the arrows.

Figure 3 is a sectional view on the line 3—3 of Figure 1 looking in the direction of the arrows.

Figure 4 is a view similar to Figure 3 showing the implement in adjusted position.

Figure 5 is a sectional view on the line 5—5 of Figure 1 looking in the direction of the arrows.

Figure 6 is a sectional view on the line 6—6 of Figure 1 looking in the direction of the arrows.

Figure 7 is a sectional view on the line 7—7 of Figure 1 looking in the direction of the arrows.

Similar reference characters indicate corresponding parts throughout the several views in the drawing.

Referring to the drawing in detail, the implement comprises a stick A having at one end a handle B and this stick simulates a walking stick while at the other end thereof is provided a swinging jaw 10 which is made from a section cut from the said stick at one side thereof and is adapted to normally occupy or be seated in the cut area 11 from which the section 10 has been taken. The jaw is adapted to swing laterally on a pivot hinge 12 which is longitudinally disposed with respect to the stick A and is countersunk in the said section 10 at the inner flat face 13 thereof and the confronting opposite flat face 14 of the end 15 of said stick A. This end 15 constitutes a stationary jaw for coacting with the swinging jaw hereinbefore described. The hinge 12 is of a kind to space the flat faces 13 and 14 the required distance apart with respect to each other when the jaw 10 is closed relative to the stationary jaw 15.

Fitted in the stick A and extended longitudinally thereof at its center is a water discharge pipe 16 which opens between the jaws 10 and 15 and has connection with a flexible contour or feed tube 18 joined with a valved outlet nipple 19 on a water reservoir or tank 20, the valve for the nipple 19 being indicated at 21 and is of the hand operable type for controlling water admission to the pipe 16 from the reservoir or tank 20. The reservoir or tank 20 is fitted with adjustable shoulder straps 22 so that the reservoir or tank 20 can be attached to the person for the carriage thereof and preferably suspended from a shoulder of such person.

The hinge 12 is preferably of that type including a spring for urging the jaw 10 toward the jaw 15 and normally closed.

Suitably built into the stick A is a door opener comprising a rod 23 having a grip 24 extending from the stick for manual manipulation and also a pusher crank 25 which lies betwen the jaws 10 and 15 and operates upon the said jaw 10 on the turning of the rod 23 in one direction for the swinging of this jaw to an open position.

Adapted to be accommodated between the jaws 10 and 15 is a plant 26 being held and clamped when the said jaw 10 is in a closed position so that it may be conveniently set in the earth or planted therein in a manner presently described. This plant 26 when held between the swinging jaw 10 and the stationary jaw 15, these being tapered at 27, will become buried in the soil or earth when the jaw end of the stick has penetrated the earth or ground for creating a hole for accommodating the plant to be set or planted.

Extended between the jaws 10 and 15 is an ejector comprising a slide rod 28 fitting guides 29 carried exteriorly on the stick A and this rod 28 is formed with the ejector prong 30 which lies between the said jaws 10 and 15 and also is provided with a grip 31 for manual actuation of said ejector. The ejector is for the purpose of freeing the plant 26 from between the jaws 10 and 15 when the said jaw 10 is shifted to an open or partially open position. Connected with the rod 28 is a coiled retractile spring 32 which is also connected to one of the guides 29 and this spring functions to normally hold the ejector in a position to have its ejector prong 30 inwardly of the space between the jaws 10 and 15 of the stick A to be aloft with respect to the plant 26 held by these jaws 10 and 15 so that the plant can be ejected when required.

Workable in the stick A is an extractor comprising a slidable rod 33 having a foot 34 which plays between the jaws 10 and 15 and is also provided with a grip 35, the said rod 33 being surrounded by a coiled expansion spring 36 countersunk within the stick A with one end seated therein and the other end working against a shoulder or the equivalent 37 on the rod 33. The spring functions to draw the foot 34 inwardly between the jaws 10 and 15. Now when the stick A has penetrated the ground or earth for the setting of the plant 26 therein, the latter being accommodated in a hole created by the jawed end of the stick A, the extractor is manually operated to have the foot 34 contact with the bottom of the hole and this is brought about through manipulation by sliding action of the rod 33 whereby the stick A can be readily and easily withdrawn from the said hole after the delivery of the plant 26 therein for the setting or planting of the same. It is, of course, understood that the pipe 16 will supply water for the softening of the soil or earth at the hole created by the stick A and also for the watering of the plant during the setting or planting thereof. After the stick has been removed from the soil, the same can be utilized as a tamping tool for the packing of the earth around the plant when set or planted. The prong 30 of the slidable rod 28 also functions to remove dirt caking between the jaws, being only usable for this purpose when the soil or earth is in a moist or wet condition.

Exteriorly on the reservoir or tank 20 are suitable racks or baskets 38 for the holding of loose plants to be planted and in this manner assuring the easy handling of such plants by the user of the implement. Also one of these racks or baskets 38 can be utilized to bring the stick A into a resting position therein when the said stick is not in use.

The jawed end of the stick A can be readily forced into the soil or earth for the formation of a hole required in the setting or planting of a plant. This plant 26 is properly held by the jaws 10 and 15 and is mechanically handled for the setting or planting thereof in the use of the stick A. When setting or planting the plant through the use of the implement, there is avoided root congestion, frost heaving and turned-up roots. The plant to be set or planted in the use of the stick A will be held by its stem and not by its roots or leaves and such plant will not become damaged during the planting or setting of the same.

One of the racks or baskets 38 is adaptable as a support for the stick A for the bringing of the latter to rest so that a loose plant can be placed between the jaws 10 and 15 for the gripping thereof by the said stick. The door opener is turnable at the grip 24 for operation of said opener whereby the swinging jaw can be acted upon and opened thereby.

The ejector and extractor are mounted for reciprocatory movement and the prongs of these function as stated, they are not turning under reciprocation of said ejector and extractor.

What is claimed is:

1. An implement of the character described comprising a stick body having a slightly tapered rounded end portion, a jaw cut from the tapered end portion and swingable thereon laterally therefrom, means holding the said jaw normally against swinging movement, an ejector carried by the stick body and having a prong workable between it and the said jaw at the tapered end for removal of a plant therefrom, means fitted with the stick body for delivering water through the tapered end of said body, means fitting the stick body and acting upon the jaw to swing the same laterally, and means upon the body and workable between the same and the said jaw for the holding of a plant within a hole created by the tapered end of said body and whereby said body can be raised for the extraction of the latter from the hole without the extraction of the plant therefrom.

2. An implement of the character described comprising a stick body having a slightly tapered rounded end portion, a jaw cut from the tapered end portion and swingable thereon laterally therefrom, means holding the said jaw normally against swinging movement, an ejector carried by the stick body and having a prong workable between it and the said jaw at the tapered end for removal of a plant therefrom, means fitted with the stick body for delivering water through the tapered end of said body, means fitting the stick body and acting upon the jaw to swing the same laterally, means upon the body and workable between the same and the said jaw for the holding of a plant within a hole created by the tapered end of said body and whereby said body can be raised for the extraction of the latter from the hole without the extraction of the plant therefrom, and means acting upon the ejector and the last-named means to normally hold the same inactive.

CODY GROVER McKEE.